(12) United States Patent
Nett

(10) Patent No.: US 6,849,017 B2
(45) Date of Patent: Feb. 1, 2005

(54) DRIVE UNIT

(75) Inventor: Hans-Peter Nett, Adenau (DE)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/247,118

(22) Filed: Sep. 19, 2002

(65) Prior Publication Data

US 2003/0054910 A1 Mar. 20, 2003

(30) Foreign Application Priority Data

Sep. 20, 2001 (DE) .......................................... 101 46 386

(51) Int. Cl.⁷ .............................................. F16H 3/72
(52) U.S. Cl. .......................................... 475/5; 475/151
(58) Field of Search ........................... 475/5, 149, 151, 475/221; 180/65.2

(56) References Cited

U.S. PATENT DOCUMENTS

| 5,744,895 | A | * | 4/1998 | Seguchi et al. ................ 310/13 |
| 6,251,037 | B1 | * | 6/2001 | Baumgaertner et al. ........ 475/5 |
| 6,394,924 | B1 | * | 5/2002 | Schiebold et al. .............. 475/5 |
| 6,425,838 | B1 | * | 7/2002 | Matsubara et al. ............. 475/5 |
| 6,425,839 | B1 | * | 7/2002 | Koelle et al. ............... 180/65.2 |
| 6,520,879 | B2 | * | 2/2003 | Kawabata et al. .............. 475/5 |
| 6,569,054 | B2 | * | 5/2003 | Kato ............................... 477/5 |
| 6,604,591 | B2 | * | 8/2003 | Bowen et al. .............. 180/65.2 |

FOREIGN PATENT DOCUMENTS

| DE | 196 39 904 A1 | 5/1997 |
| DE | 198 41 829 A1 | 3/2000 |
| DE | 696 11 823 T2 | 6/2001 |

* cited by examiner

Primary Examiner—Roger Pang
Assistant Examiner—Dennis J. Abdelnour

(57) ABSTRACT

A drive unit (20) particularly suited for a motor vehicle 1 which is driven by a plurality of axles, which drive unit (20) comprises a primary drive source for solely driving a first driving axle (2), and a secondary drive source which, together with the primary drive source, via a superposition drive, serves to drive a second driving axle (3). The drive unit comprises a superposition drive (14) which comprises a first input shaft (17) for establishing a driving connection with a primary driveshaft, a second input shaft (18) and an output shaft (19), and an electric motor (15) with a rotor and a stator constituting the secondary drive source whose one part (rotor, stator) is connected to the second input shaft (18) of the superposition drive (14) and whose other part (stator, rotor) is connected to a further rotating member of the superposition drive (14).

42 Claims, 4 Drawing Sheets

DRIVE UNIT

TECHNICAL FIELD

The invention relates to a drive unit, particularly suited for, but not limited to, a motor vehicle driven by a plurality of axles. The vehicle includes a primary drive source, such as an engine and a gearbox connected thereto with a variable transmission ratio, for solely driving a first driving axle, as well as a secondary drive source which, together with the primary drive source, via a superposition drive, serves to drive a second driving axle.

BACKGROUND OF THE INVENTION

DE 42 23 296 C2 proposes a drive system for four wheel drive vehicles. An internal combustion engine with a gearbox, via a first driveline, directly drives a first driving axle. A second driveline comprises a superposition drive with two inputs and one output which serves to drive the second driving axle of the motor vehicle. The first input is driven by the output shaft of the gearbox with a constant transmission ratio. The second input of the superposition drive is driven by an infinitely variable traction mechanism drive with a variable rotational speed. There thus exists a driving connection between the traction mechanism drive and the output shaft of the gearbox. Separating the superposition drive from the gearbox in terms of location is not possible.

SUMMARY OF THE INVENTION

The present invention provides a drive unit of the foregoing type for a motor vehicle driven by a plurality of axles. The drive unit permits a greater degree of freedom with respect to design and functionability when adapting the distribution of torque and/or the torque conditions between the first and the second axle of the motor vehicle.

The present invention provides a drive unit, such as for a motor vehicle driven by a plurality of axles, said motor vehicle comprising a primary drive source with a constant transmission ratio for solely driving a first driving axle, as well as a secondary drive source with a variable transmission ratio, which, together with the primary drive source, via a superposition drive, serves to drive a second driving axle. The drive unit comprises a superposition drive which comprises a first input shaft for establishing a driving connection with a primary drive source, a second input shaft and an output shaft, as well as an electric motor with a rotor and a stator, the electric motor being the secondary drive source whose one part (rotor, stator) is connected to the second input shaft of the superposition drive and whose other part (rotor, stator) is connected to a further rotating member of the superposition drive.

The present drive unit is advantageous in that, at the output shaft, it is possible to control both the torque and the rotational speed within a certain range, independently of the torque and the rotational speed at the first input shaft which is drivingly connected to the primary drive source. Because there is a driving connection between the second input shaft of the superposition drive and an electric motor which is supported inside the superposition drive in the direction of rotation, it is possible for the drive unit together with the secondary drive source to be arranged so as to be separate in terms of space from the primary drive source. This may be necessary, for example, in a four wheel drive motor vehicle with an internal combustion engine as a primary drive source at the rear axle. The electric motor is additionally advantageous because of its low-wear, noise-free and delay-free characteristics and because it is continuously controllable.

According to a first embodiment, the electric motor is supported inside the superposition drive in the direction of rotation in such a way that, for example, the stator is connected to the first input shaft in a rotationally fast way, and the rotor is connected to the second input shaft in a rotationally fast way. According to a further advantageous embodiment, the electric motor is mounted in the superposition drive in such a way that the rotor is connected to the second input shaft in a rotationally fast way, and the stator is at least indirectly connected to the output shaft in a rotationally fast way. In this way, provided the two superimposed rotational speeds are identical, i.e. if the rotor and stator stand still relative to one another and if the electric motor rotates as one, the first driving axle and the second driving axle can be driven at the same rotational speed and with a constant distribution of torque.

According to an advantageous embodiment of the inventive drive unit, the superposition drive is a planetary drive with a carrier shaft, a sun gear, at least one planetary gear and a hollow gear. The first input shaft constitutes the carrier shaft and rotatably carries the at least one planetary gear which is arranged eccentrically. The second input shaft is connected to the sun gear in a rotationally fast way, and the hollow gear is connected to the output shaft in a rotationally fast way. The second input shaft is provided in the form of a hollow shaft and the sun gear and/or the second input shaft are rotatably supported on the first input shaft. The advantage of this embodiment is that, as the rotor is connected to the sun gear in a rotationally fast way, the electric motor has to generate a supporting moment only, which supporting moment is much smaller than the torque of the output shaft. In consequence, the electric motor can be small in volume and weight.

According to a further embodiment of the invention, the electric motor comprises a cup-shaped housing part which accommodates the stator and which is connected to the first input shaft in a rotationally fast way.

The output shaft and the hollow gear can be produced in one piece and form the cover part. Between the cover part and the housing part there is provided a rotational seal which prevents dirt from entering the superposition drive and lubricant from leaving same. At its cover end, the housing part is connected to the carrier shaft in a rotationally fast way to ensure that it is securely supported when subjected to torque loads.

According to a further embodiment, the electric motor comprises a cup-shaped housing part which contains the stator and which is connected to the output shaft in a rotationally fast way.

In this embodiment, the output shaft and/or the hollow gear can form a cover part which is connected to the cup-shaped housing part so as to be rotationally fast and sealed. The housing part can be rotatably supported on the input shaft.

The housing part may be provided with current receiving means for supplying the anchor windings of the electric motor with current, which current receiving means cooperate with fixed means for supplying current. In particular, the transfer of current can take place in a contact-free way. There can be provided electronic means for brush-less commutation purposes. The rotor of the electric motor can be formed by permanent magnets.

According to yet a further embodiment of the invention, the first input shaft or carrier shaft on the one hand and the hollow gear and/or the output shaft on the other hand are rotatably supported inside one another. In this way, the axial size of the drive unit is reduced to a minimum while providing an advantageous shaft bearing length.

Furthermore, an embodiment in accordance with the invention comprises in a motor vehicle driven by a plurality of axles, having at least one first driving axle and at least one second driving axle, comprising a primary drive source which, via a first driveline, preferably with a constant transmission ratio, is drivingly connected to the first driving axle and which, via a second driveline, is drivingly connected to the second driving axle. The embodiment also includes a drive unit which is arranged in the second driveline and which comprises a superposition drive with a first input shaft, a second input shaft and cutout shaft as well as an electric motor as a secondary drive source. The first input shaft is drivingly connected to the primary drive source. The second input shaft is drivingly connected to the electric motor and the output shaft is drivingly connected to the second driving axle. Furthermore, the electric motor with its rotor and its stator is connected in a rotationally fast way to different rotating members of the superposition drive respectively.

Such a motor vehicle is advantageous in that, by driving the electric motor of the inventive drive unit, it is possible to avoid torsion in the second driveline, such torsion being generated by the different central track radii which are covered by the wheels of the first driving axle relative to the wheels of the second driving axle when negotiating a curve. In this way, driving stability is increased and tire wear reduced.

According to another embodiment, the first driving axle is the rear axle of the motor vehicle, with the wheels of same being unsteered. The vehicle referred to here is thus a motor vehicle with a rear engine. The primary drive source can be the internal combustion engine and gearbox with a variable transmission ratio which, in this embodiment, is associated with the rear axle.

Alternatively, it is possible for the first driving axle to be the front axle, with its wheels being steerable. With such a vehicle, the engine is arranged in front, and the primary drive source, i.e. the internal combustion engine and gearbox with a variable transmission ratio are associated with the front axle. The drive unit in the second driveline can be put into effect in a motor vehicle in accordance with the invention in all its above-mentioned embodiments.

Furthermore, an embodiment in accordance with the invention provides a method of controlling the drive of an inventive motor vehicle, wherein, as a function of the driving condition parameters, the electric motor is speed and, respectively, torque-controlled and/or, as a function of the driving condition parameters, the electric motor is supplied with current or electrically disconnected.

In order to ensure that the first input shaft and the output shaft of the drive unit and thus the first driving axle and the second driving axle are driven at the same rotational speed and with a constant distribution of torque, it is proposed that, when the vehicle drives in a straight line without being braked, the electric motor is supplied with current in such a way the rotor and stator stand still relative to one another or are driven at a fixed relative speed. When the vehicle is driven without being braked, the electric motor has to generate a holding moment between the first input shaft and the second input shaft, which holding moment is smaller than the driving moment of the first input shaft.

Furthermore, by driving the electric motor, the rotational speed of the output shaft in curves is controlled in such a way that the wheels of the second driving axle roll in a slip-free way. The rotational speed of the second driving axle when the vehicle negotiates curves is controlled by driving the electric motor, preferably as a function of the steering angle of a steerable vehicle axle which can be the first or the second driving axle.

According to another embodiment, to allow slip-free driving, the torque of the second driving axle is controlled by supplying current to the electric motor as a function of the rotational speeds of the first driving axle and of the second driving axle. If, as a result of different degrees of surface adhesion, one wheel or several wheels of the motor vehicle slip, there occurs a speed differential between the first input shaft and the output shaft, which speed differential can be reduced and, in the best of cases, compensated for by changing the torque of the electric motor.

Otherwise, relative to the stator of the electric motor, the rotor can be driven in both directions of rotation and also braked in both directions of rotation. This means that the electric motor can be driven in all four quadrants of its characteristic field.

If the motor vehicle comprises a control system for controlling its driving dynamics, such as an electronic stability program (ESP), according to a further embodiment of the method, the electric motor is switched off when the control system is activated, with the rotor and the stator being able to rotate largely freely relative to one another. In this way, it is ensured that the drive unit with the electric motor does not interfere with the driving dynamics of the motor vehicle. However, it is possible, especially when the electronic stability program (ESP) is activated, to activate the electric motor, but its control can be incorporated in the overall control circuit which, in consequence, is provided with an additional control variable.

If the motor vehicle comprises an antilock brake system (ABS), one embodiment of the method ensures that by disconnecting the electric motor during braking, a torque-locking connection between the first driving axle and the second driving axle leading to over-braking or locking of the wheels of one of tine two axles, as a result of which the driving stability of the motor vehicle would be at risk, is avoided. However, in this case, too, active control of the electric motor within the ABS control circuit is possible.

According to another embodiment of the inventive method, the electric motor is supplied with electric current by an on-board network of the motor vehicle with a 42 volt output voltage.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
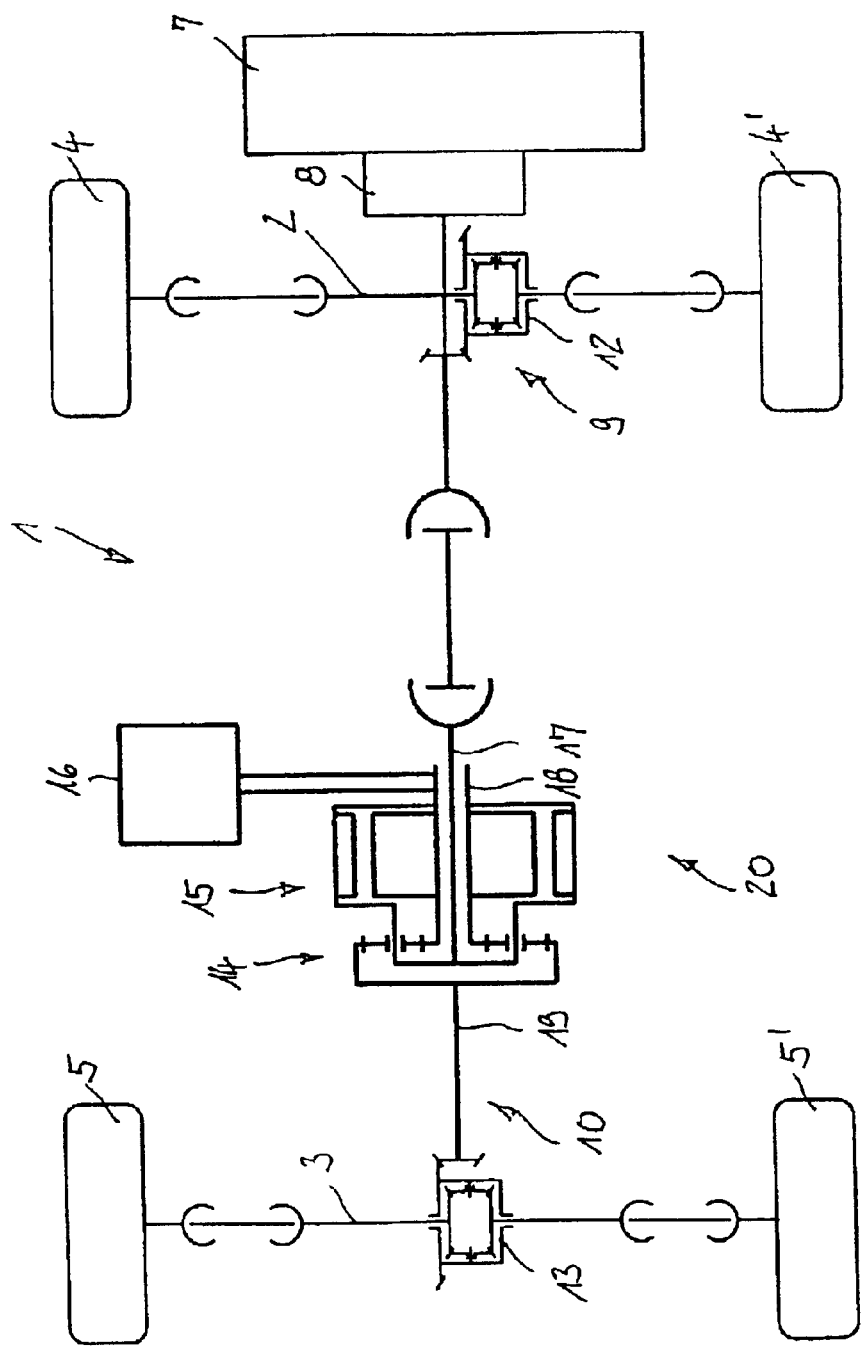
FIG. 1 shows the driving principles of a motor vehicle provided with a drive unit in accordance with the invention.

FIG. 1 shows a diagram indicating the driving principles of a motor vehicle 1 with a driven first axle 2 forming the rear axle and with a driven second axle 3 forming the front axle. The wheels 4 and 4' of the first axle 2 are unsteered, whereas the wheels 5 and 5' of the second axle 3 are steerable. At the rear of the motor vehicle 1, there is provided an engine 7 which is drivingly connected via a clutch (not shown) to a multi-stage gearbox 8.

The multi-stage gearbox 8, with a constant transmission ratio, drives a first driveline 9 comprising the first axle 2 with a first axle differential 12. Furthermore, the multi-stage gearbox 8, with a continuously variable transmission ratio, drives a second driveline 10 comprising the second axle 3, a second axle differential 13 and an inventive drive unit 20. The drive unit 20 comprises a planetary drive 14 and an electric motor 15 provided in the form of a torque motor which is a DC servo-motor designed to generate a maximum torque when standing still. The electric motor 15 is supplied with electric current by a voltage source 16 associated with the motor vehicle.

Figure 2:
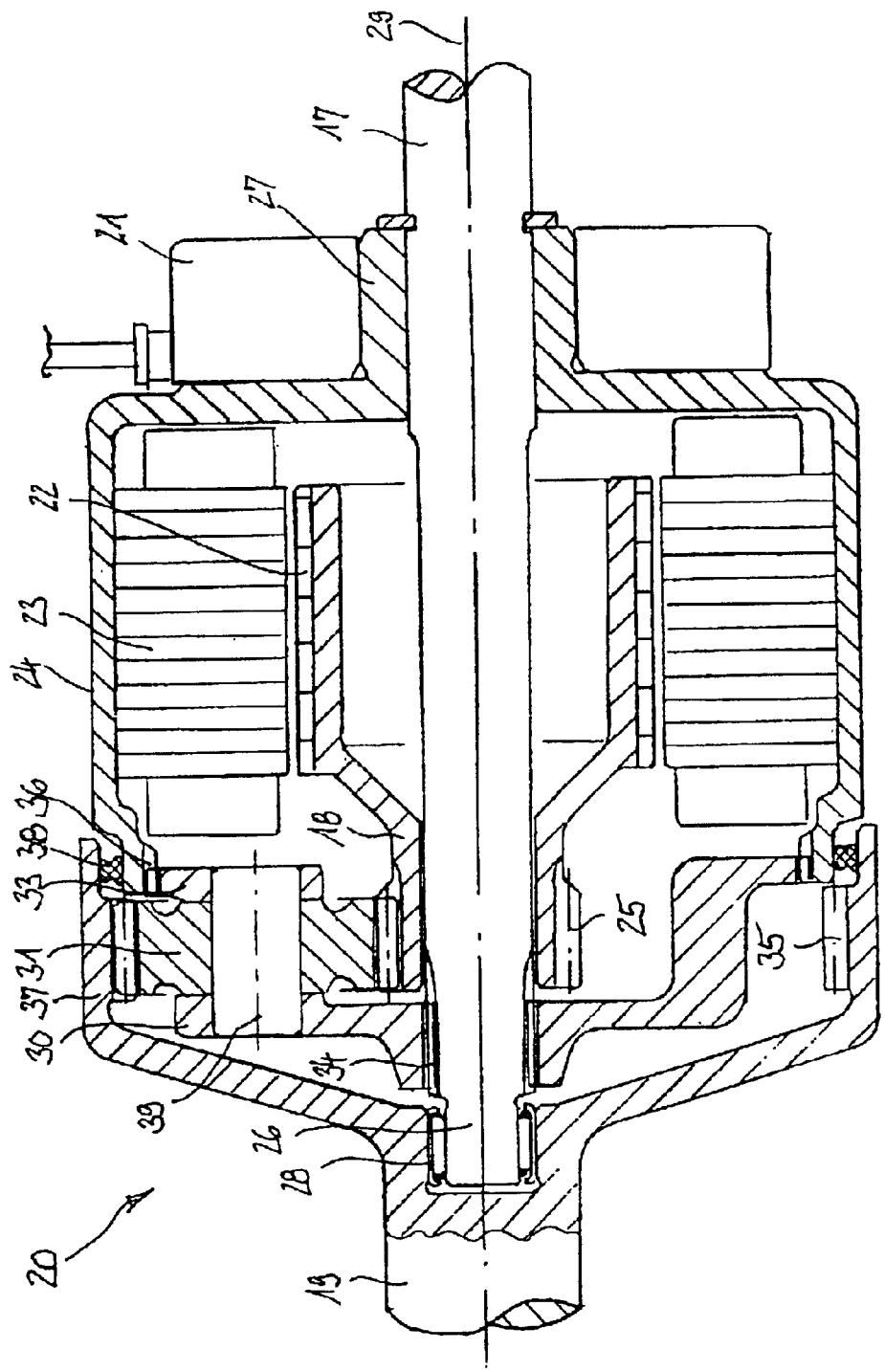
FIG. 2 is a longitudinal section through a drive unit according to FIG. 1 in the form of a detail.

In the embodiments according to FIGS. 1 and 2, the inventive drive unit 20 comprises a first input shaft 17 drivingly connected to the multi-stage gearbox 8, a second input shaft 18 drivable by the electric motor 15, as well as an output shaft 19 driving the second axle differential 13 and thus the second axle 3. The electric motor 15 comprises a rotor 22 directly connected to the second input shaft 18, and a stator 23 inserted into a cup-shaped housing part 24 which is connected in a rotationally fast way to the first input shaft 17. The electric motor is supplied with electric current, such as in a contact-free way, by current receiving member 27 provided at a cylindrical end of the housing part 24, via fixed current supplying member 21 from the voltage source 16 of the motor vehicle.

The second input shaft 18 is provided in the form of a hollow shaft and is rotatably supported on the first input shaft 17. At the end of the second input shaft 18 facing the output shaft 19, there is attached a sun gear 25 which forms part of the planetary drive 14. The first input shaft 17 comprises a journal 26 which is supported in a bearing bore 28 of the output shaft 19. A web 30 is connected in a rotationally fast way to the first input shaft 17 by toothing 34, and a planetary gear 31 is rotatably supported on said web 30 around an axis of rotation 39 arranged eccentrically relative to the longitudinal axis 29. In addition to the planetary gear 31 shown in the longitudinal section, further such planetary gears can be provided in other sectional planes. A radial arm 33 is attached to the web 30 in a rotationally fast way, with the planetary gear 31 being arranged axially between the web 30 and the radial arm 33. At its radially outer end, the arm 33 is connected to the housing part 24 by toothing 36 in a rotationally fast way.

The output shaft 19 comprises a hollow gear 35 which forms part of the planetary drive 14. The output shaft 19 and the hollow gear 35 are produced in one piece and form the cover part 37. Between the inner face of the cover part 37 and the outer face of the housing part 24 there is provided a rotational seal 38.

On its radial outside, the planetary gear 31 engages the hollow gear 35 and on its radial inside, it engages the sun gear 25.

Figure 3:
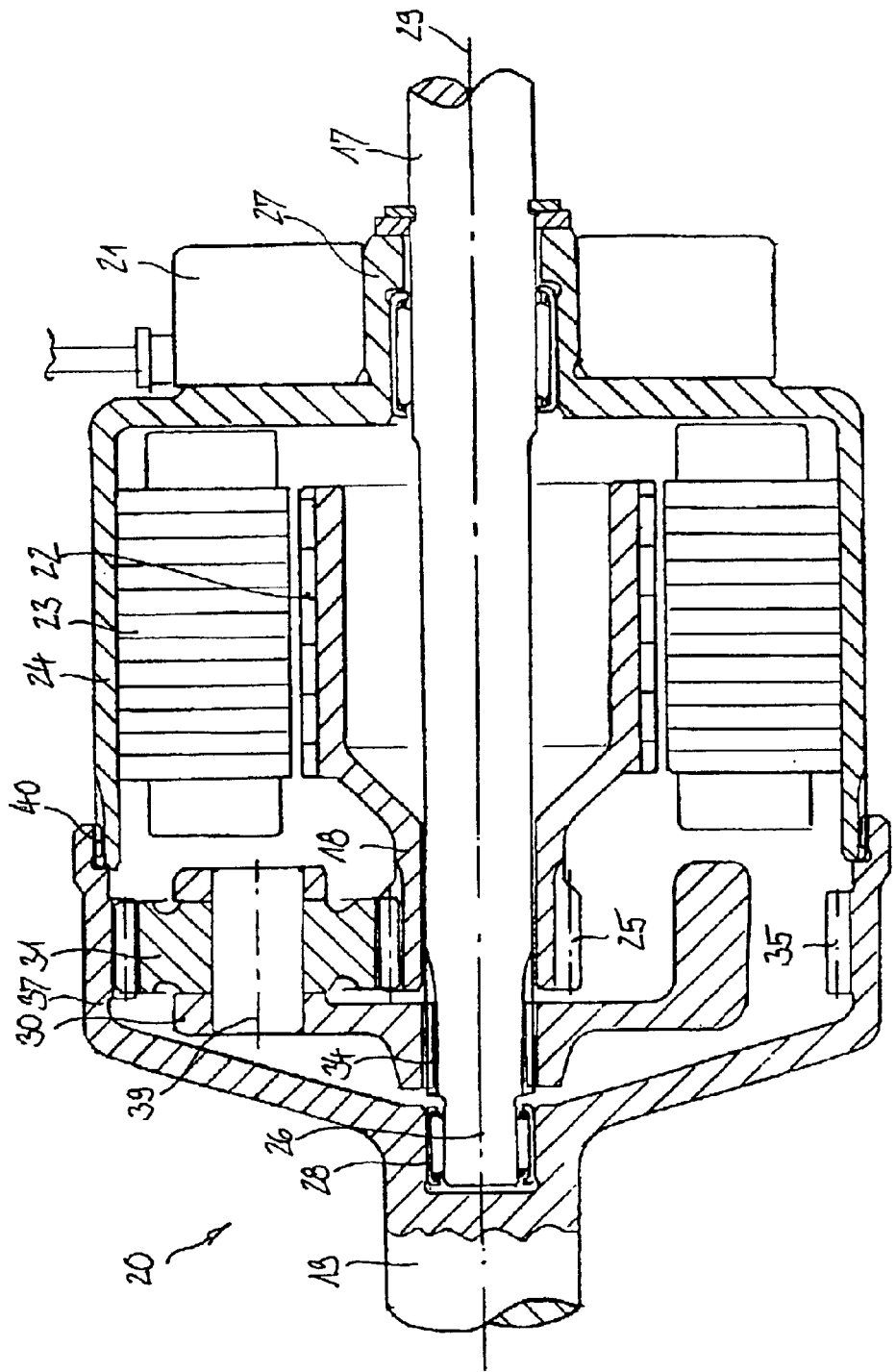
FIG. 3 is a longitudinal section through a drive unit similar to that shown in FIG. 1, in the form of a detail.

In the embodiment according to FIG. 3, the inventive drive unit 20 comprises a first input shaft 17 drivingly connected to the multistage gearbox 8, a second input shaft 18 drivable by the electric motor 15, and an output shaft 19 which drives the second axle differential 13 and thus the second axle 3. The electric motor 15 comprises a rotor 22 directly connected to the second input shaft 18, and a stator 23 which is inserted into a cup-shaped housing part 24 which is connected to the output shaft 19 in a rotationally fast way. The electric motor is supplied with electric current, such as in a contact-free way, via current receiving member 27 provided at a cylindrical end of the housing part 24, via fixed current supplying member 21 from the voltage source 16 of the motor vehicle.

The second input shaft 18 is provided in the form of a hollow shaft and rotatably supported on the first input shaft 17. At the end of the second input shaft 18 facing the output shaft 19, there is attached a sun gear 25 which forms part of the planetary drive 14. The first input shaft 17 comprises a journal 26 which is supported in a bearing bore 28 of the output shaft 19. A web 30 is connected in a rotationally fast way to the first input shaft 17 by toothing 34, and a planetary gear 31 is rotatably supported on said web 30 around an axis of rotation 39 arranged eccentrically relative to the longitudinal axis 29. In addition to the planetary gear 31 shown in the longitudinal section further such planetary gears can be provided in other sectional planes.

The output shaft 19 comprises a hollow gear 35 which forms part of the planetary drive 14. The output shaft 19 and the hollow gear 35 are produced in one piece and form the cover part 37. Between the inner face of the cover part 37 and the outer face of the housing part 24 there is provided toothing 40 which provides a rotationally fast connection between the housing part 24 with the inserted stator 23 and the cover part 37 with the output shaft 19.

On its radial outside, the planetary gear 31 engages the hollow gear 35 and on its radial inside, it engages the sun gear 25.

Figure 4:
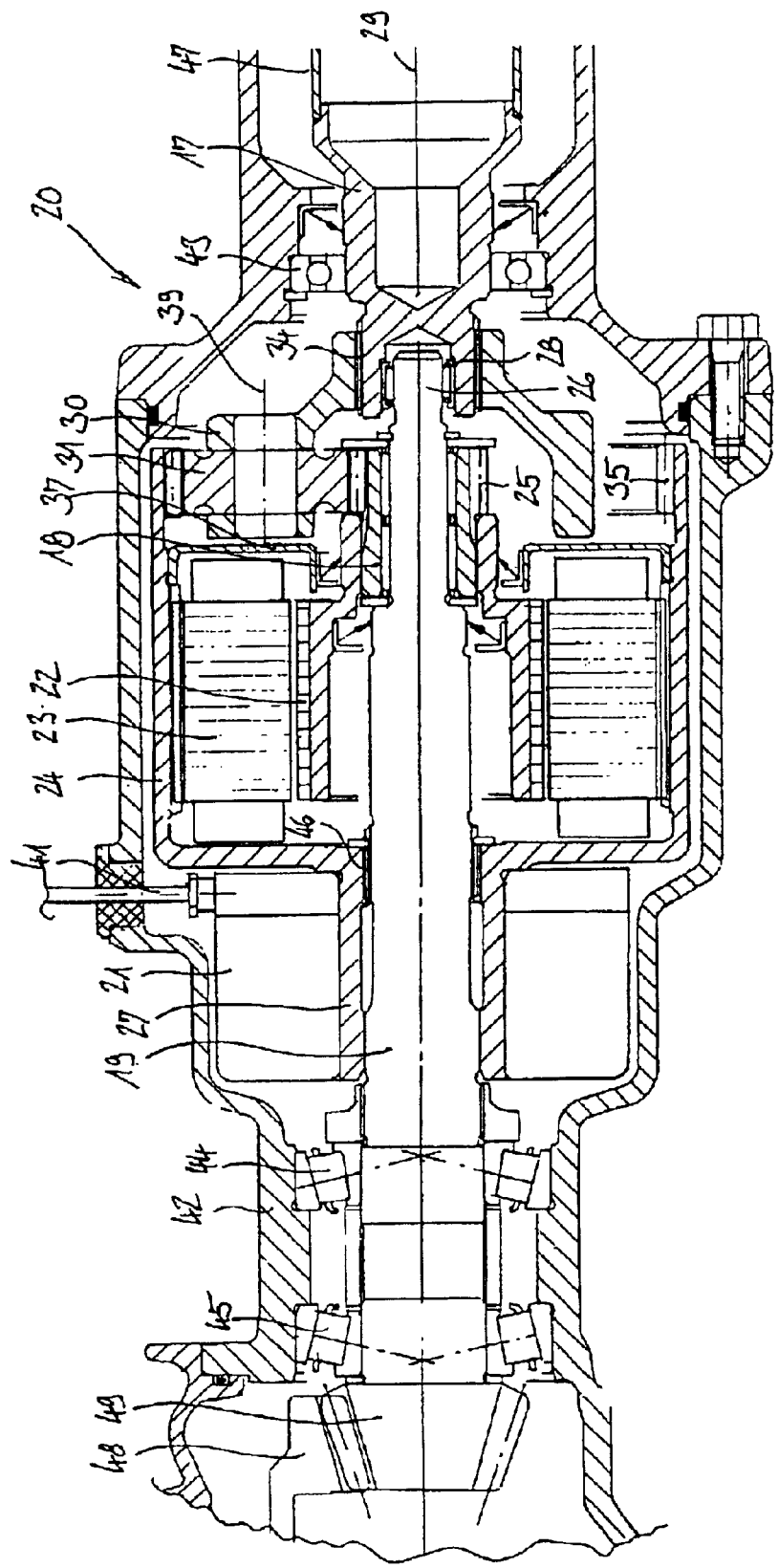
FIG. 4 is a longitudinal section through a drive unit with a housing in a modified embodiment.

In the embodiment according to FIG. 4, the inventive drive unit 20 is rotatably supported in a transaxle housing 42. A ball bearing 43 supports a first input shaft 17, and two angular roller bearings 44, 45 support an output shaft 19. The input shaft 17 is fixed to a propeller shaft 47. The output shaft 19 is provided with a pinion 49 which engages a ring gear 48. The first input shaft 17 is drivingly connected to the multi-stage gearbox 8 via a propeller shaft 47, the second input shaft 18 is drivable by the electric motor 15, the output shaft 19 drives the second axle differential 13 and thus the second axle 3. The electric motor 15 comprises a rotor 22 connected to the second input shaft 18 as well as a stator 23 which is inserted into a cup-shaped housing part 24 connected in a rotationally fast way to the output shaft 19 via toothing 46. A cover part 37 made of sheet metal is inserted into the housing part 24 and rotates therewith. The electric motor is supplied with electric current, such as in a contact-free way, by current receiving member 27 provided at a cylindrical end of the housing part 24, via fixed current supplying member 21 from the voltage source 16 of the motor vehicle. A power cable leads into the housing 42.

The second input shaft 18 is provided in the form of a hollow shaft and is rotatably supported on the output shaft 19. At the end of the output shaft 19 facing the input shaft 17, there is attached a sun gear 25 which forms part of the planetary drive 14. The first output shaft 19 comprises a journal 26 which is supported in a bearing bore 28 of the input shaft 17. A web 30 is connected in a rotationally fast way to the first input shaft 17 by toothing 34, and a planetary gear 31 is rotatably supported on said web 30 around an axis of rotation 39 arranged eccentrically relative to the longitudinal axis 29. In addition to the planetary gear 31 shown in the longitudinal section further such planetary gears can be provided in other sectional planes.

The output shaft 19 comprises a hollow gear 35 which forms part of the planetary drive 14. On its radial outside, the planetary gear 31 engages the hollow gear 35 and on its radial inside, it engages the sun gear 25.

Under normal driving conditions, the motor vehicle 1 moves in a straight line, with no wheel slip occurring at the wheels 4, 4', 5, 5'. The output shaft of the multi-stage gearbox 8 rotates and drives the first axle 2 as well as the superposition drive 14 via an input shaft 17. At the same time, the electric motor 15 generates a braking moment which prevents the rotor 22 and the stator 23 from rotating relative to one another. This means that the first input shaft 17, the second input shaft 18 and the output shaft 19 rotate at the same speed around the longitudinal axis 29. The planetary gear 31 does not carry out a rotational movement around its own axis of rotation 39, but rotates with the first input shaft 17, the second input shaft 18 and the output shaft 19 around the longitudinal axis 29 so as to stand still relative to said parts. From the planetary gear 31, the torque is transmitted via the hollow gear 35 to the output shaft 19. In this way, it is ensured that the torque and speed of the first input shaft 17 are transmitted to the output shaft 19 at a transmission ratio of 1:1. This means that the second axle 3 is driven at the same speed and at the same torque as the first axle 2, as a result of which there is achieved four-wheel drive of the vehicle.

The rotor 22 of the electric motor is drivingly connected to the second input shaft 18, as a result of which the torque is introduced at the sun gear 25. Furthermore, the stator 23 is inserted into the housing part 24 which has approximately the same diameter as the hollow gear 35. Thus, the supporting torque which has to be generated by the electric motor 15 to be able to transmit the full driving torque of the first input shaft 17 to the output shaft 19, is very much lower than the output torque.

When curves are negotiated, the front wheels 5, 5' of the steered second axle 3 describe a larger circular arch around the instant center of the motor vehicle 1 than the rear wheels 4, 4' of the first axle 2 which is driven at a constant transmission ratio by the multi-stage gearbox 8. This is the reason why the front wheels 5, 5' have to rotate faster than the rear wheels 4, 4' to prevent any torsion in the driveline and to ensure that the wheels drive in a slip-free way. For this purpose, a control scheme which, for example, form part of a control system for controlling the driving dynamics of the motor vehicle 1, controls the torque and braking moment generated by the electric motor 15. A correspondingly increased torque of the electric motor 15 ensures that the rotational speed of the sun gear 25 is reduced, as required, relative to the rotational speed of the first input shaft 17. As a result, the hollow gear 35 rotates faster and the speed of the front wheels 5, 5' increases to a level at which they drive in a slip-free way.

In a motor vehicle according to an alternative embodiment wherein the gearbox drives the front wheels at a constant transmission ratio and the rear wheels at a variable transmission ratio, the functioning mode is reversed. In this case, it is necessary to control the speed of the rear wheels which, in curves, have to rotate more slowly than the front wheels in order to take into account the different radii of the track curves. A correspondingly reduced torque of the electric motor ensures that the rotational speed of the sun gear increases, as required, relative to the rotational speed of the first input shaft. As a result, the hollow gear rotates more slowly and the speed of the rear wheels drops to a level at which they drive in a slip-free way.

When one front wheel or both front wheels 5, 5' of the steered second axle 3 spin, for example due to different friction conditions relative to the road surface, the rotational speed of the second axle 3 has to be reduced relative to that of the first axle 2 and a higher torque has to be transmitted to the first axle 2. For this purpose, the torque generated by the electric motor 15 is reduced in accordance with the speed differential between the first input shaft 17 and the output shaft 19, so that the sun gear 18 rotates faster than the first input shaft 17. As a result, the hollow gear 35 rotates more slowly and the speed of the front wheels 5, 5' drops to a level at which they drive in a slip-free way.

With reference to a motor vehicle 1 which comprises a control system for controlling the driving dynamics, an electronic stability program (ESP), the electric motor is switched off when the control system is activated and the rotor 22 and the stator 23 are able to rotate freely relative to one another. In this way, it is ensured that the superposition drive 14 does not interfere with the driving dynamics of the motor vehicle. Furthermore, by disconnecting the electric motor 15 during braking, it is ensured that the torque-locking connection between the first axle 2 and the second axle 3 does not lead to over-braking and locking of the wheels 4, 4', 5, 5' of one of the two axles 2, 3.

From the foregoing, it can be seen that there has been brought to the art a new and improved drive unit which is advantageous for four-wheel vehicles. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A drive unit (20) comprising:
   a superposition drive (14) comprising a first input shaft (17) for establishing a drive connection with a primary drive source, a second input shaft (18) and an output shaft (19),
   an electric motor (15) having a rotor (22) and a stator (23), the electric motor being a secondary drive source, one of the rotor or stator being connected to the second input shaft (18) of the superposition drive (14) and the other of the rotor or stator being connected to a further rotating member of the superposition drive (14), and
   wherein the superposition drive (14) is a planetary drive with a carrier shaft, a sun sear (25), at least one planetary gear (31) and a hollow gear (35), wherein the first input shaft (17) comprises the carrier shaft and rotatably carries the at least one planetary gear (31) which is arranged eccentrically, the second input shaft (18) is connected to the sun gear (25) in a rotationally fast way, and the hollow gear (35) is connected to the output shaft (19) in a rotationally fast way.

2. A drive unit according to claim 1 wherein the rotor (22) is connected to the second input shaft (18) in a rotationally fast way and the stator (23) is connected at least indirectly to the output shaft (19) in a rotationally fast way.

3. A drive unit according to claim 1 wherein the second input shaft (18) is a hollow shaft.

4. A drive unit according to claim 1 wherein the sun gear (25) or the second input shaft (18) are rotatably supported on the first input shaft (17).

5. A drive unit according to claim 1 wherein the first input shaft (17) and either of the hollow gear (35) or the output shaft (19) are directly rotatably supported inside one another.

6. A drive unit according to claim 1 comprising a cup-shaped housing part (24) in which there is arranged the stator (23), the housing part (24) being connected to the output shaft (19) in a rotationally fast way, and wherein the output shaft (19) or the hollow gear (35) form a cover part, and a rotationally fast connection (40) is effective between said cover part and the housing part (24).

7. A drive unit according to claim 1 wherein the electric motor (15) comprises a housing part (24) accommodating the stator (23), the housing part (24) being provided with a current receiving member (27) which cooperates with a stationary current supplying member (21).

8. A drive unit according to claim 1 wherein the rotor (22) of the electric motor (15) is formed by permanent magnets.

9. A drive unit (20) comprising:
- a superposition drive (14) comprising a first input shaft (17) for establishing a drive connection with a primary drive source, a second input shaft (18) and an output shaft (19),
- an electric motor (15) having a rotor (22) and a stator (23), the electric motor being a secondary drive source, one of the rotor or stator being connected to the second input shaft (18) of the superposition drive (14) and the other of the rotor or stator being connected to a further rotating member of the superposition drive (14); and
- a cup-shaped housing part (24) in which there is arranged the stator (23), the housing part (24) being connected to the output shaft (19) in a rotationally fast way.

10. A drive unit according to claim 9 wherein the housing part (24) is rotatably supported on the input shaft (17).

11. A motor vehicle (1) driven by a plurality of axles comprising:
- at least one first driving axle (2);
- at least one second driving axle (34);
- a primary drive source which, via a first driveline (9), is directly drivingly connected to the first driving axle (2) and which, via a second driveline (10), is controllably drivingly connected to the second driving axle (3); and
- a drive unit (20) which is arranged in the second driveline (10) and which comprises a superposition drive (14) with a first input shaft (17), a second input shaft (18), an output shaft (19), and an electric motor (15) as a secondary drive source, wherein the first input shaft (17) is drivingly connected to the primary drive source, the second input shaft (18) is drivingly connected to the electric motor (15) and the output shaft (19) is drivingly connected to the second driving axle (3), and wherein, the electric motor, comprising a rotor and a stator is connected in a rotationally fast way to different rotating members of the superposition drive (14) respectively.

12. A motor vehicle according to claim 11 wherein the primary drive source comprises an internal combustion engine and a gearbox with a variable ratio.

13. A motor vehicle according to claim 11 wherein the first driving axle (2) is a rear axle having unsteered wheels (4,4').

14. A motor vehicle according to claim 12 wherein the internal combustion engine (7) and the gearbox (8) are associated with a rear axle having unsteered wheels (4,4').

15. A motor vehicle according to claim 11 wherein the first driving axle (2) comprises a first axle differential (12) and the second driving axle (3) comprises a second axle differential (13).

16. A motor vehicle according to claim 11 wherein the rotor (22) and the stator (23) are connected to the first input shaft (17) and to the second input shaft (18) of the superposition drive (14) respectively.

17. A motor vehicle according to claim 11 wherein the rotor (22) and the stator (23) are connected to one of the input shafts (17, 18) and to the output shaft (19) of the superposition drive, respectively.

18. A motor vehicle according to claim 11 wherein the superposition drive (14) is a planetary drive with a carrier shaft, a sun gear (25), at least one planetary gear (31) and a hollow gear (35), wherein the first input shaft (17) comprises the carrier shaft and rotatably carries the at least one planetary gear (31) which is arranged eccentrically, the second input shaft (18) is connected to the sun gear (25) in a rotationally fast way, and the hollow gear (35) is connected to the output shaft (19) in a rotationally fast way.

19. A motor vehicle according to claim 18 wherein the second input shaft (18) is a hollow shaft.

20. A motor vehicle according to claim 18 wherein the sun gear (25) or the second input shaft (18) are rotatably supported on the first input shaft (17).

21. A motor vehicle according to claim 18 wherein the first input shaft (17) and either of the hollow gear (35) or the output shaft (19) are directly rotatably supported inside one another.

22. A motor vehicle according to claim 18 comprising a cup-shaped housing part (24) accommodating the stator (23), the housing part (24) being connected to the first input shaft (17) in a rotationally fast way, and at its cover end, the housing part (24) is connected to the carrier shaft (30) in a rotationally fast way.

23. A motor vehicle according to claim 18 comprising a cup-shaped housing part (24) accommodating the stator (23), the housing part (24) being connected to the output shaft (19) in a rotationally fast way, and wherein the output shaft (19) or the hollow gear (35) form a cover part and a rotationally fast connection is effective between the cover part and the housing part.

24. A motor vehicle according to claim 11 comprising a cup-shaped housing part (24) accommodating the stator (23), the housing part (24) being connected to the first input shaft (17) in a rotationally fast way.

25. A motor vehicle according to claim 24 wherein either of the output shaft (19) or the hollow gear (35) form a cover part (37), and a rotational seal (38) is provided between said cover part (37) and the housing part (24).

26. A motor vehicle according to claim 11 comprising a cup-shaped housing part (24) accommodating the stator (23), the housing part (24) being connected to the output shaft (19) in a rotationally fast way.

27. A motor vehicle according claim 26 wherein the housing part (24) is rotatably supported on the input shaft (17).

28. A motor vehicle according to claim 11 wherein the electric motor (15) comprises a housing part (24) accommodating the stator (23), the housing part (24) being provided with a current receiving member (27) which cooperates with a stationary current supplying member (21).

29. A motor vehicle according to claim 11 wherein the rotor (22) of the electric motor (15) is formed by permanent magnets.

30. A drive system for a motor vehicle having at least one first driving axle (2) and at least one second driving axle (3), the drive comprising:

a primary drive source which, via a first driveline (9), is directly drivingly connected to a first driving axle (2) and which, via a second driveline (10) is controllably drivingly connected to the second driving axle (3); and a drive unit (20) which is arranged in the second driveline (10) and which comprises a superposition drive (14) with a first input shaft (17), a second input shaft (18), an output shaft (19), and an electric motor (15) as a secondary drive source, wherein the first input shaft (17) is drivingly connected to the primary drive source, the second input shaft (18) is drivingly connected to the electric motor and the output shaft (19) is drivingly connected to the second axle (3), and wherein, the electric motor includes a rotor and a stator connected in a rotationally fast way to different rotating members of the superposition drive (14), respectively;

wherein the electric motor (15) is adapted to be speed controlled or torque controlled as a function of driving condition parameters.

31. A system according to claim 30 wherein, when the vehicle (1) is driven in a straight line without being braked, the electric motor (15) is supplied with current in such a way that its rotor (22) and its stator (23) stand still relative to one another.

32. A system according to claim 30 wherein, by driving the electric motor (15), the rotational speed of the output shaft (19) in curves is controlled in such a way that wheels (5, 5') of the second driving axle (3) roll in a slip-free way.

33. A system according to claim 30 wherein, when the vehicle negotiates curves, a rotational speed of the second driving axle (3) is controlled by driving the electric motor as a function of a steering angle of the steerable axle of the motor vehicle.

34. A system according to claim 30 wherein, for slip-free driving, a torque of the second driving axle (3) is controlled by supplying the electric motor (15) with current as a function of the speeds of the first driving axle and of the second driving axle.

35. A system according to claim 30 wherein, when activating a driving dynamics control system of the motor vehicle, the electric motor (15) is electrically disconnected or controlled.

36. A system according to claim 30 wherein, when activating a motor vehicle brake system including an ABS system, the electric motor (15) is electrically disconnected controlled.

37. A drive system for a motor vehicle having at least one first driving axle (2) and at least one second driving axle (3), the drive comprising:

a primary drive source which, via a first driveline (9), is directly drivingly connected to a first driving axle (2) and which, via a second driveline (10) is controllably drivingly connected to the second driving axle (3); and a drive unit (20) which is arranged in the second driveline (10) and which comprises a superposition drive (14) with a first input shaft (17), a second input shaft (18), an output shaft (19), and an electric motor (15) as a secondary drive source, wherein the first input shaft (17) is drivingly connected to the primary drive source, the second input shaft (18) is drivingly connected to the electric motor and the output shaft (19) is drivingly connected to the second axle (3), and wherein, the electric motor includes a rotor and a stator connected in a rotationally fast way to different rotating members of the superposition drive (14), respectively;

wherein the electric motor (15) is supplied with current or electrically disconnected as a function of driving condition parameters.

38. A system according to claim 37 wherein, when the vehicle (1) is driven in a straight line without being braked, the electric motor (15) is supplied with current in such a way that its rotor (22) and its stator (23) stand still relative to one another.

39. A system according to claim 37 wherein, by driving the electric motor (15), the rotational speed of the output shaft (19) in curves is controlled in such a way that wheels (5, 5') of the second driving axle (3) roll in a slip-free way.

40. A system according to claim 37 wherein, when the vehicle negotiates curves, a rotational speed of the second driving axle (3) is controlled by driving the electric motor as a function of a steering angle of the steerable axle of the motor vehicle.

41. A system according to claim 37 wherein, for slip-free driving, a torque of the second driving axle (3) is controlled by supplying the electric motor (15) with current as a function of the speeds of the first driving axle and of the second driving axle.

42. A system according to claim 37 wherein, when activating a driving dynamics control system of the motor vehicle, the electric motor (15) is electrically disconnected or controlled.

* * * * *